G. F. GODLEY.

Assignor of one-half Interest to C. Scott.

CAR-SPRING.

No. 7,832. Reissued Aug. 7, 1877.

Witnesses:

P. C. Dieterich

Frank A. Duffy

Inventor:

Geo. F. Godley

Per S. Wright Duval Attorney.

N. PETERS, PHOTO-LITHOGRAPHER, WASHINGTON, D. C.

UNITED STATES PATENT OFFICE.

GEORGE F. GODLEY, OF PHILADELPHIA, PENNSYLVANIA, ASSIGNOR OF ONE-HALF INTEREST TO CHARLES SCOTT.

IMPROVEMENT IN CAR-SPRINGS.

Specification forming part of Letters Patent No. 161,115, dated March 23, 1875; Reissue No. 7,832, dated August 7, 1877; application filed March 27, 1877.

*To all whom it may concern:*

Be it known that I, GEORGE F. GODLEY, of the city and county of Philadelphia, State of Pennsylvania, have invented new and useful Improvements in Springs; and I do hereby declare that the following, taken in connection with the drawings which accompany and form part of this specification, is a description of my invention sufficient to enable those skilled in the art to practice it.

My invention consists in the preparation of bars from which edge-coiled spiral springs are to be formed by making them of such cross-section that the compression of the metal of the inner part of the coil, and the extension of the metal in the outer part of the coil, shall render the bearing-surfaces of adjacent coils parallel, and afford a surface contact of the whole or part of contiguous coils when the spring is closed. This is effected by making the two opposite flat surfaces of the thickest part relatively inclined toward each other, so that when the bar is coiled such inclined surfaces shall become parallel with each other by reason of the outer part being extended and thinned, while the inner part becomes compressed and thickened; and it further consists in combining two conical springs, one on top of the other, by employing a wooden or iron piece having hubs projecting into the center of each, and serving to prevent their separation.

Figure 1:
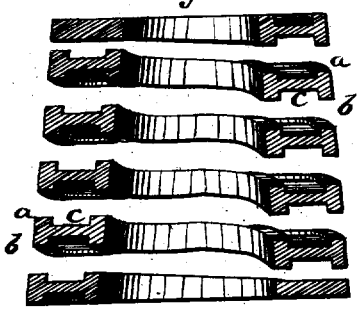
Figure 2:
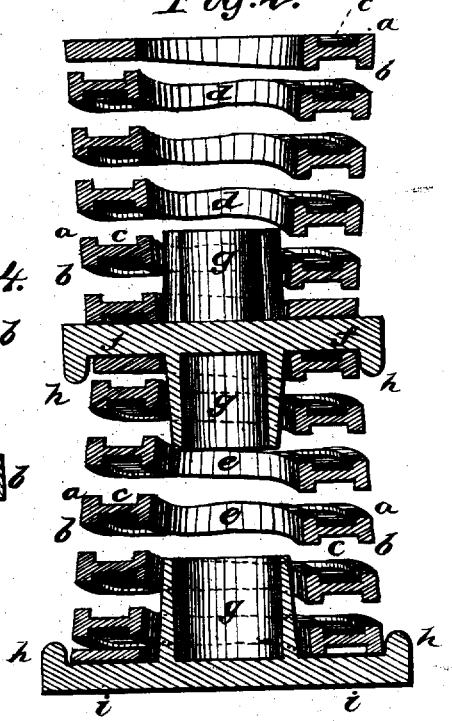
Figure 4:
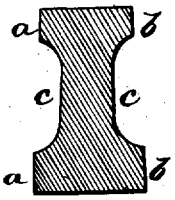
Figure 3:
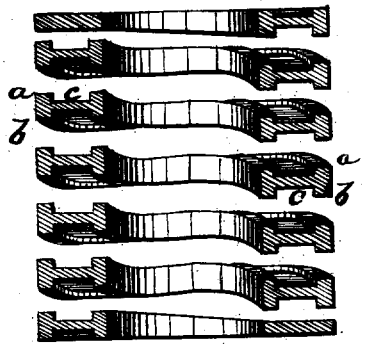
Figure 5:
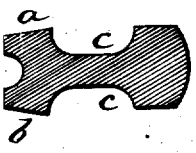
Figure 6:
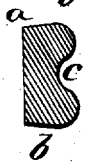
Figure 7:
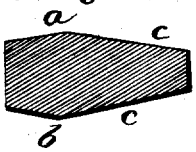

In the drawings, Figure 1 shows a vertical section of a spring coiled into a conical shape, and made from one form of my improved bar. Fig. 2 shows a vertical section of two of such conical springs when used one upon the other. Fig. 3 is a spring of cylindrical form, or of uniform diameter, made from a similar bar. Fig. 4 shows the cross-section of the bar, suitable for a car-spring, and before it has been coiled to form the springs shown in Figs. 1, 2, and 3; and Figs. 5, 6, and 7 represent cross-sections of several varieties of bars, having their opposite faces inclined to a degree which will insure their becoming parallel after being coiled.

In the drawing it will be seen that the faces *a b*, which in the blank or uncoiled bar incline to each other, in the coiled spring become parallel with each other, thus affording a broad base or bed for the coils whenever a heavy load or sudden compression shall bring the coils in contact. Moreover, there is greater strength in the spring itself than when there is not equality of thickness in the body of the coiled bar. The spring being made of steel hardened and tempered, it will be understood that the thinnest part, *c*, will be hardened throughout, giving the requisite resilience or elasticity, while the thickest portion, being only surface-hardened, retains a toughness conducive to strength. When coiled into the conical shape the compression of the spring exhausts the resilience of the largest part first, so that as the pressure increases one coil lies flat upon the next one, just as one leaf of an elliptic spring lies upon the next leaf, and the coils are not injured in the least when so compressed, because of the adjacent surfaces being flat and parallel, affording a perfect support.

In Fig. 2 two springs, *d* and *e*, such as above described, are shown arranged for use as a compound spring, the two being loosely connected by employing a plate, *f*, of wood or iron, having axial projections or pins *g*, which are respectively lodged in the smaller end of each spiral, the plate having, if desired, a rim, *h*, on either or both faces, and I also use a similar plate, *i*, having, however, one central boss or pin for the top or bottom, or for both.

In this mode of using my improved spring—that is, in two parts—which I find desirable in some cases, as, for instance, for a passenger-car bolster-spring, I secure an increased amount of elasticity, and if by accident either part should break, it can easily be removed and another substituted, but for most purposes I find that practically a single spring of my constructing affords as soft and easy a motion as is needed. Instead of coiling a bar in the form of a cone, it may be coiled on a cylindrical mandrel, and thus be of uniform diameter throughout.

When desired for a bearing-spring, a nest or several of these springs, either conical or cylindrical, are placed side by side in a box, which may be skeleton or otherwise, or they can be inserted in the bolster by boring a hole in the same when space permits, and the spring introduced into the same.

I employ bars of various other forms in cross-section, all, however, having the especial characteristic first above named, to wit, their opposite sides so inclined to each other that when the bar is coiled they shall become parallel, whether the thinner part shall be coiled on the outside or inside of the coil, and whether the full width of the bar be thus parallel or otherwise.

While my improved construction is admirably adapted for railway-cars, yet it is applicable for almost every purpose where a coiled spring can be employed.

I claim—

1. A spiral solid plate-spring having the upper and lower surfaces of the thickest part of the plate parallel when coiled, substantially as set forth.

2. A spiral solid plate-spring having the opposite surfaces of the plate parallel when coiled, and the plate itself thinner at its central portion, substantially as set forth.

3. The combination, with the two cone-shaped coils *d e*, of the plate *f*, provided with axial or with rim projections, substantially as set forth.

4. An edge-coiled spiral spring whose metal displaced by coiling has parallel bearings or supporting-surfaces in the contiguous coils, in conjunction with a thinner web, substantially as shown and described.

5. An edge-coiled spiral spring having a form in cross-section of the bar, substantially as shown and described, whereby the adjacent coils shall have parallel surfaces for a portion only of the breadth of the bar.

6. An edge-coiled spiral spring made of a bar of metal having a central flat-sided connecting-web of lesser thickness than the edges which it connects, substantially as shown and described.

7. An edge-coiled spiral spring made of a bar of metal having its opposite faces flat and inclined to each other, and having a reduced or lesser central thickness, substantially as shown and described.

8. An edge-coiled spiral spring made from a bar having a center of less thickness than the edges, and having one or more flat inner edges, substantially as shown and described.

9. As an article of manufacture, a blank form or bar of metal adapted for coiled springs, having the inclined opposite sides, and a thinner portion or web, as shown and described.

GEORGE F. GODLEY.

Witnesses:

ANDW. J. BOSWELL,
ARTHUR BOSWELL.